(No Model.)

G. B. LUMPKIN.
AXLE NUT.

No. 372,227. Patented Oct. 25, 1887.

WITNESSES:
Fred G. Dieterich
P. B. Turpin.

INVENTOR:
G. B. Lumpkin
BY Munn &Co
ATTORNEYS.

UNITED STATES PATENT OFFICE.

GEORGE BUCHANAN LUMPKIN, OF LEXINGTON, GEORGIA.

AXLE-NUT.

SPECIFICATION forming part of Letters Patent No. 372,227, dated October 25, 1887.

Application filed July 14, 1887. Serial No. 244,335. (No model.)

*To all whom it may concern:*

Be it known that I, GEORGE BUCHANAN LUMPKIN, of Lexington, in the county of Oglethorpe and State of Georgia, have invented a new and useful Improvement in Axle-Nuts, of which the following is a specification.

This invention is an improvement in axle-nuts, or what may be termed "hub-attaching devices," and has for an object to provide a simple and easily-operated device by which to take up the wear of the hub-box of a vehicle, so as to cause such box to fit properly at all times between the inner flange of the axle-arm and the nut screwed on the outer end of such arm.

To this end the invention consists in certain features of construction and novel combinations of parts, as will be hereinafter described.

Figure 1:
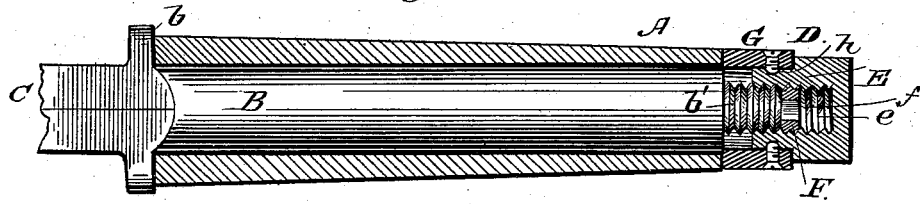
Figure 2:
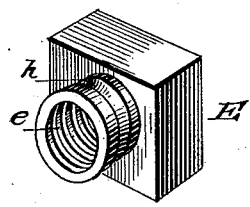
Figure 3:
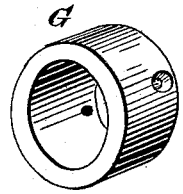
Figure 4:
Figure 5:
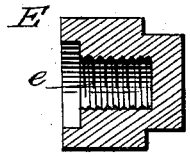

In the drawings, Figure 1 is a side view of one end of an axle-arm provided with my improved nut, the latter and the hub-box being shown in section. Fig. 2 is a detail view of the body or main portion of the nut. Fig. 3 shows the external revolving washer. Fig. 4 is a detail view of the internal threaded disk, and Fig. 5 shows a somewhat different form of the body of the nut from that shown in Figs. 1 and 2.

When a vehicle is new, if properly made, the box A of the hub runs closely between the collar or shoulder b on the inner end of the spindle B of the axle C and the inner face of the nut D, which nut is screwed on the outer threaded end, b', of the spindle. As the several parts wear with use, the box will have a certain play between the collar and nut, which is very objectionable, as, in addition to producing excessive wear on the parts immediately concerned, it also racks and injures the other parts of the wagon or other vehicle. Ordinarily leather washers are used to take up this wear; but manifestly such expedients are troublesome to use, easily lost or misplaced, especially when oiling the wagon, and soon wear out.

My invention seeks to so construct the nut as to take up the wear by a simple adjustment of the parts, which adjustment may be quickly effected, as will be understood from the following description.

The main portion or body E of the nut is formed with a socket, e. This socket is formed from the inner end of the part E, and the threaded disk presently described is turned from such end into the socket. I provide this socket with threads to fit it to turn on the threaded end of the axle, and also to adapt it to receive the threaded disk F, which is formed to screw into said socket, so it may be set or adjusted to any position between the opposite ends of such socket. To the inner end of the body I journal the revolving washer G, which fits over the axle and has an internal diameter sufficiently large to permit it to fit up on the spindle beyond the threaded portion thereof. The journaling of this washer on the body of the nut is preferably accomplished by forming an annular groove, h, in said body and passing screw or rivet pins H through the revolving washer into said groove. This construction retains the washer G in position, and at the same time permits it to revolve freely on the body of the nut.

While I prefer in some instances to employ the external washer, manifestly it might be omitted if the mouth of the socket e be made large enough to pass up over the unthreaded portion of the spindle. When the hub-box is first fitted to the wagon, the internal washer, F, is turned nearly out to the mouth of the socket in the nut, leaving sufficient bearing, however, for the threaded engagement of part E with the threaded end of the spindle.

To facilitate the adjustment of the disk F, it is, by preference, provided with an angular opening or socket, f, to receive a pointed stick, wrench, or other implement by which it may be turned. This washer will remain where set until intentionally moved, and will hold the nut in the place desired by the pressure of said washer firmly against the end of the spindle. Manifestly the nut may be made of any desired size, shape, length, or thickness, and of any suitable material to suit the vehicle, it being adapted for use on all sorts of wheeled vehicles. It will also be understood that the invention may be used on old vehicles.

It will be noticed that the projecting portion of my revolving washer—that is to say, the portion which projects beyond the body of the nut—has a smooth interior, which permits the said washer, when in place on an axle, to revolve without affecting the turning of the nut proper.

Having thus described my invention, what I claim as new is—

1. An axle-nut having a body portion provided with a circumferential groove, $h$, a revolving washer journaled on the inner end of said body over the groove $h$ and having a portion which projects beyond the same, such projecting portion having a smooth interior, whereby the washer, when on an axle, may revolve thereon independently of the body of the nut, and a pin or pins extended from the washer into groove $h$, whereby to prevent any longitudinal movement of the washer on the body of the nut, substantially as and for the purposes specified.

2. The combination, with an axle-spindle and a nut having its body portion provided with a groove, $h$, and threaded thereon, of a washer having a projecting portion fitted on said spindle in advance of the body portion of the nut, said washer being journaled on said body portion, whereby it may turn independently thereof, and having the interior of its projecting portion formed to turn freely on the spindle, whereby in use the washer may, when on the spindle, turn freely independently of the body portion of the nut, and a pin or stud extended from the washer into the groove $h$, substantially as and for the purposes specified.

3. The combination of the axle-spindle, the body portion of the nut having a threaded socket to receive the tenon of the spindle, the threaded disk fitted in said socket, whereby it may be set at different points therein to be impinged by the end of the spindle, and the washer journaled to the inner end of the body portion and having its projecting portion constructed to turn freely on the spindle, all being substantially as described, whereby the washer, when on the spindle, may turn freely independently of the body of the nut, substantially as and for the purposes specified.

GEORGE BUCHANAN LUMPKIN.

Witnesses:
W. A. LATIMER,
ARTHUR HAIRE.